(12) United States Patent
Terata et al.

(10) Patent No.: US 9,469,511 B2
(45) Date of Patent: Oct. 18, 2016

(54) EXHAUST EMISSION CONTROL DEVICE FOR ROUGH TERRAIN CRANE

(71) Applicant: Tadano Ltd., Takamatsu (JP)

(72) Inventors: Kimihiko Terata, Takamatsu (JP); Shinya Seko, Takamatsu (JP); Ryo Honda, Takamatsu (JP)

(73) Assignee: Tadano Ltd., Takamatsu (JP)

( * ) Notice: Subject to any disclaimer, the term of this patent is extended or adjusted under 35 U.S.C. 154(b) by 0 days.

(21) Appl. No.: 14/302,775

(22) Filed: Jun. 12, 2014

(65) Prior Publication Data
US 2015/0001170 A1    Jan. 1, 2015

(30) Foreign Application Priority Data

Jun. 28, 2013   (JP) .................................. 2013-135846

(51) Int. Cl.
| | |
|---|---|
| *F01N 3/00* | (2006.01) |
| *B66C 13/52* | (2006.01) |
| *F01N 3/10* | (2006.01) |
| *F01N 3/20* | (2006.01) |
| *F01N 3/035* | (2006.01) |
| *F01N 13/00* | (2010.01) |
| *B01D 53/94* | (2006.01) |

(52) U.S. Cl.
CPC .............. *B66C 13/52* (2013.01); *B01D 53/94* (2013.01); *F01N 3/035* (2013.01); *F01N 3/106* (2013.01); *F01N 3/2066* (2013.01); *F01N 13/009* (2014.06); *F01N 13/011* (2014.06); *F01N 2340/04* (2013.01); *F01N 2590/08* (2013.01); *Y02T 10/24* (2013.01)

(58) Field of Classification Search
CPC .... F02D 41/029; F01N 9/002; F01N 3/0842; F01N 3/035; F01N 13/02; B60K 13/04
USPC .................... 60/299, 301, 295; 180/296, 309
See application file for complete search history.

(56) References Cited

U.S. PATENT DOCUMENTS

| | | | |
|---|---|---|---|
| 3,144,138 A | 8/1964 | Brown et al. | |
| 2010/0000203 A1* | 1/2010 | Kowada ............. | B01D 46/0027 60/286 |
| 2012/0247861 A1* | 10/2012 | Mizuno .................. | B60K 13/04 180/296 |
| 2013/0213726 A1* | 8/2013 | Okada ................... | E02F 9/0866 180/309 |

(Continued)

FOREIGN PATENT DOCUMENTS

| | | |
|---|---|---|
| EP | 2199554 A1 | 6/2010 |
| EP | 2474672 A1 | 7/2012 |

(Continued)

OTHER PUBLICATIONS

European Search Report, corresponding European patent application No. EP 14002190, mailed Nov. 24, 2014.

*Primary Examiner* — Patrick Maines
(74) *Attorney, Agent, or Firm* — Marshall, Gerstein & Borun LLP

(57) ABSTRACT

A new rough terrain crane has an exhaust emission control device that has a DOC, a DRT, and a SCR. The DOC and the DRT are connected in series and disposed along a longitudinal direction of a vehicle. A rear end of the DOC is positioned at the front side relative to a rear end of an engine. The SCR is disposed in parallel to the DOC and both devices are disposed above a support member of a rear outrigger. The SCR is disposed on the upper side relative to the DOC at a position close to the engine.

6 Claims, 5 Drawing Sheets

(56) References Cited

U.S. PATENT DOCUMENTS

| | | | |
|---|---|---|---|
| 2014/0102085 A1* | 4/2014 | Mori | E02F 9/0866 60/301 |
| 2014/0299401 A1* | 10/2014 | Nakagami | E02F 9/0866 180/309 |
| 2014/0326527 A1* | 11/2014 | Harada | E02F 9/0866 180/309 |
| 2015/0184568 A1* | 7/2015 | Maeda | F01N 3/0814 60/286 |

FOREIGN PATENT DOCUMENTS

| | | | |
|---|---|---|---|
| JP | 2005-155404 | 6/2005 | |
| JP | 2009-085065 | 4/2009 | |
| JP | 4286888 B2 | 7/2009 | |
| JP | 2010-196523 | 9/2010 | |
| JP | 2012097413 A * | 5/2012 | |
| JP | EP 2474672 A1 * | 7/2012 | ......... B60H 1/00378 |
| JP | 2012-149535 | 8/2012 | |

\* cited by examiner (a)

(b)

(a)

(b)

EXHAUST EMISSION CONTROL DEVICE FOR ROUGH TERRAIN CRANE

CROSS-REFERENCE TO RELATED APPLICATION

This application claims priority on Patent Application No. 2013-135846 filed in Japan on Jun. 28, 2013.

FIELD OF THE INVENTION

The present invention relates to the structure of an exhaust emission control device for diesel engines to be mounted in rough terrain crane vehicles.

DESCRIPTION OF THE RELATED ART

The exhaust emission of diesel engines contain particulate matter (hereinafter referred to as "PM"), nitride oxide (hereinafter referred to as "NOx"), and the like. In order to prevent air pollution, a device which prevents these substances from being emitted to the air has been developed heretofore. Such a device is referred to as an exhaust emission control device (or an after-treatment device).

The exhaust emission control device contains a diesel particulate filter for collecting the PM (hereinafter referred to as "DPF"), a diesel oxidation catalyst (hereinafter referred to as "DOC") for removing the NOx, a decomposition reactor tube (hereinafter referred to as "DRT"), and a selective catalytic reduction (hereinafter referred to as "SCR") as the constituent elements. By combining the constituent elements, a desired exhaust emission control device is constituted (as disclosed in, for example, Japanese Patent No. 4286888 (JP 4286888 B), and Japanese Patent Laid-open Publication No. 2010-196523 (JP2010-196523 A)).

The diesel engine is mounted in various vehicles. The need for exhaust emission control treatment exists in all vehicle types and also in passenger automobiles, trucks, and construction vehicles, such as cranes. However, the constituent elements of the exhaust emission control device vary depending on the intended use, and the size of vehicle and the mounting space in the vehicle is naturally restricted. Therefore, various layouts of the constituent elements of the exhaust emission control device have been proposed (as disclosed in, for example, Japanese Patent Laid-open Publication No. 2012-149535 (JP2012-149535 A) and Japanese Patent Laid-open Publication No. 2005-155404 (JP2005-155404 A).

The rough terrain crane is generally a vehicle that has a four-wheel capable of performing four-wheel drive and four-wheel steering, and allows vehicle travel and crane operation from a single driver seat. The rough terrain crane demonstrates excellent small-radius turning performance and rough terrain traveling performance. Rough terrain cranes are designed to be compact for best performance, and the vehicle overall length is generally short, with an engine is placed at the rear of the body all the crane operations are hydraulically controlled.

In order for the rough terrain crane to demonstrate the above-described performance, mounting of the exhaust emission control device should not increase the overall length and the overall width of the body and the visibility and visual field from the driver seat during crane operation and the traveling should be maintained.

When the DOC, the DRT, and the SCR are aligned along the front-back axis of the vehicle, the exhaust emission control device protrudes from a vehicle end portion, an overhang may increase the turn radius of the vehicle in some cases. Moreover, interference between the exhaust emission control device and the driver seat should not occur when the crane operation is operating or turning, and that consideration reduces design flexibility. On the other hand, when the DOC, the DRT, and the SCR are disposed in parallel along width of the vehicle, the overall width and the overall height of the vehicle increase, so that a dead angle expands in the crane operation and in traveling. Moreover, interference between the exhaust emission control device and a counter weight or the like should also be avoided, and that consideration also reduces design flexibility. To avoid such problems, a special care must be given in laying out the constituent elements of the exhaust emission control device.

SUMMARY OF THE INVENTION

The invention has been made in view of the above-described circumstances. It is an object of the invention to provide an exhaust emission control device for rough terrain crane which provides excellent small-radius turning performance and rough terrain traveling performance with a compact body, while offering excellent visibility and a favorable visual field in crane operation and traveling.

(1) The exhaust emission control device for rough terrain crane of the invention has a carrier having a front axle and a rear axle, a boom device disposed on an upper side of the carrier, and a single operation unit for traveling and performing crane operation through a hydraulic actuator, in which the carrier has a lower frame, a front outrigger disposed on a lower side of a front end of the lower frame, a rear outrigger disposed on a lower side of a rear end of the lower frame, and an engine disposed on a rear end portion of the lower frame, which is for traveling and supplying hydraulic pressure. The exhaust emission control device for rough terrain crane has a diesel oxidation catalyst which is coupled to an exhaust pipe extending from the engine and to which exhaust emission is supplied, a decomposition reactor tube disposed on a downstream of the diesel oxidation catalyst, and a selective catalytic reduction disposed on a downstream of the decomposition reactor tube. The decomposition reactor tube is joined to the diesel oxidation catalyst or the selective catalytic reduction in series along the longitudinal direction of the lower frame and the diesel oxidation catalyst and the selective catalytic reduction are disposed in parallel in such a manner as to face each other along the lateral direction of the lower frame. The diesel oxidation catalyst is disposed along the longitudinal direction above a support member supporting a case of the rear outrigger and the selective catalytic reduction is disposed along the longitudinal direction on the upper side relative to the diesel oxidation catalyst.

According to the invention, the diesel oxidation catalyst and the selective catalytic reduction face each other and are disposed in parallel in the lateral direction of the lower frame, i.e., in the vehicle width direction. Thus, the space required for disposing the exhaust emission control device in the lower frame, particularly the dimension in the longitudinal direction (vehicle overall length direction), is reduced as compared with the case where the devices are disposed in series. Moreover, although the decomposition reactor tube is joined to the diesel oxidation catalyst or the selective catalytic reduction in series along the longitudinal direction, the dimension in the lateral direction (vehicle width direction) required for mounting the exhaust emission control device is also reduced because the diesel oxidation catalyst and the selective catalytic reduction are disposed in parallel. Furthermore, the diesel oxidation catalyst is disposed along the longitudinal direction above the support member and the selective catalytic reduction is disposed above the diesel oxidation catalyst. More specifically, the diesel oxidation catalyst and the selective catalytic reduction which are disposed in parallel are disposed at a position that is adjacent to the engine and above the rear outrigger. In other words, the diesel oxidation catalyst, the selective catalytic reduction, and the decomposition reactor tube, which are laid out in a compact manner, are disposed on the left end or the right end of the rear end portion of the vehicle.

(2) The selective catalytic reduction is preferably disposed at a position on the side of the engine relative to the diesel oxidation catalyst.

In this configuration, the selective catalytic reduction is further shifted to the center of the vehicle and can be disposed at a position close to the engine. More specifically, the diesel oxidation catalyst, the selective catalytic reduction, and the decomposition reactor tube may be disposed in the upper space of the rear outrigger this is beneficial in that the route of the exhaust emission control treatment is shortened.

(3) The support member may be a strengthening rib for coupling the lower frame and the case of the rear outrigger.

In general, the strengthening rib has a right triangle shape erected on the boundary of the lower frame and the case. The diesel oxidation catalyst and the selective catalytic reduction are disposed in parallel along the inclination of the bottom portion of the strengthening rib (an inclined portion from the lower frame to the case).

(4) The support member may be a hydraulic cylinder that is disposed between the lower frame and the case of the rear outrigger and presses the case against the ground surface.

In this case, the rear outrigger is an X type. In the case of the X type rear outrigger, a dead space is formed around the hydraulic cylinder due to the design. However, in the invention, the diesel oxidation catalyst and the selective catalytic reduction are disposed in parallel in the dead space.

(5) The exhaust emission control device for rough terrain crane of the invention has a carrier having a front axle and a rear axle, a boom device disposed on an upper side of the carrier, and a single operation unit traveling and performing crane operation through a hydraulic actuator, in which the carrier has a lower frame, a front outrigger disposed on a lower side of a front end of the lower frame, a rear outrigger disposed on a lower side of a rear end of the lower frame, and an engine disposed on a rear end portion of the lower frame, which is for traveling and supplying hydraulic pressure. The exhaust emission control device for rough terrain crane has a diesel particulate filter which is coupled to an exhaust pipe extending from the engine and to which exhaust emission is supplied, a decomposition reactor tube disposed on the downstream of the diesel particulate filter, and a selective catalytic reduction disposed on the downstream of the decomposition reactor tube. The decomposition reactor tube is joined to the diesel particulate filter or the selective catalytic reduction in series along the longitudinal direction of the lower frame and the diesel particulate filter and the selective catalytic reduction are disposed in parallel in such a manner as to face each other along the lateral direction of the lower frame. The diesel particulate filter is disposed along the longitudinal direction above a support member supporting a case of the rear outrigger and the selective catalytic reduction is disposed along the longitudinal direction on the upper side relative to the diesel particulate filter.

According to the invention, the diesel particulate filter and the selective catalytic reduction face each other and are disposed in parallel in the lateral direction of the lower frame, i.e., in the vehicle width direction. Thus, the space required for disposing the exhaust emission control device in the lower frame, particularly the dimension in the longitudinal direction (vehicle overall length direction), is reduced as compared with the case where the devices are disposed in series. Moreover, although the decomposition reactor tube is joined to the diesel particulate filter or the selective catalytic reduction in series along the longitudinal direction, the dimension in the lateral direction (vehicle width direction) required for mounting the exhaust emission control device is also reduced because the diesel particulate filter and the selective catalytic reduction are disposed in parallel. Furthermore, the diesel particulate filter is disposed along the longitudinal direction above the support member and the selective catalytic reduction is disposed above the diesel particulate filter. More specifically, the diesel particulate filter and the selective catalytic reduction which are disposed in parallel are disposed at a position that is adjacent to the engine and above the rear outrigger. In other words, the diesel particulate filter, the selective catalytic reduction, and the decomposition reactor tube, which are laid out in a compact manner, are disposed on the left end or the right end of the rear end portion of the vehicle.

(6) The selective catalytic reduction is preferably disposed at a position on the side of the engine relative to the diesel particulate filter.

In this configuration, the selective catalytic reduction is further shifted to the center of the vehicle and can be disposed at a position close to the engine. More specifically, the diesel particulate filter, the selective catalytic reduction, and the decomposition reactor tube may be disposed in the upper space of the rear outrigger. This is beneficial in that the route of the exhaust emission control treatment is shortened.

(7) The support member may be a strengthening rib for coupling the lower frame and the case of the rear outrigger.

In general, the strengthening rib whose shape is a right triangle is erected on the boundary of the lower frame and the case. The diesel particulate filter and the selective catalytic reduction are disposed in parallel along the inclination of the bottom portion of the strengthening rib (an inclined portion from the lower frame to the case).

(8) The support member may be a hydraulic cylinder that is disposed between the lower frame and the case of the rear outrigger and presses the case against the ground surface. As described above, the rear outrigger is an X type. In the case of the X type rear outrigger, a dead space is formed around the hydraulic cylinder due to the design. However, in the invention, the diesel particulate filter and the selective catalytic reduction are disposed in parallel in the dead space.

(9) As described above, the diesel oxidation catalyst, the selective catalytic reduction, and the decomposition reactor tube, which are laid out in a compact manner, are disposed on the left end or the right end of the rear end portion of the vehicle, and therefore, during crane operation, e.g., when the boom is turned and the like, the size of the so-called drivers blind spot can be kept small. As a result, the exhaust emission control device helps to maintain the merits of the rough terrain crane, and helps provide excellent visibility and a favorable visual field.

DESCRIPTION OF THE PREFERRED EMBODIMENTS

Hereinafter, a preferred embodiment of the invention is described in detail with reference to the drawings as appropriate.

Overall Configuration and Features

Figure 1:
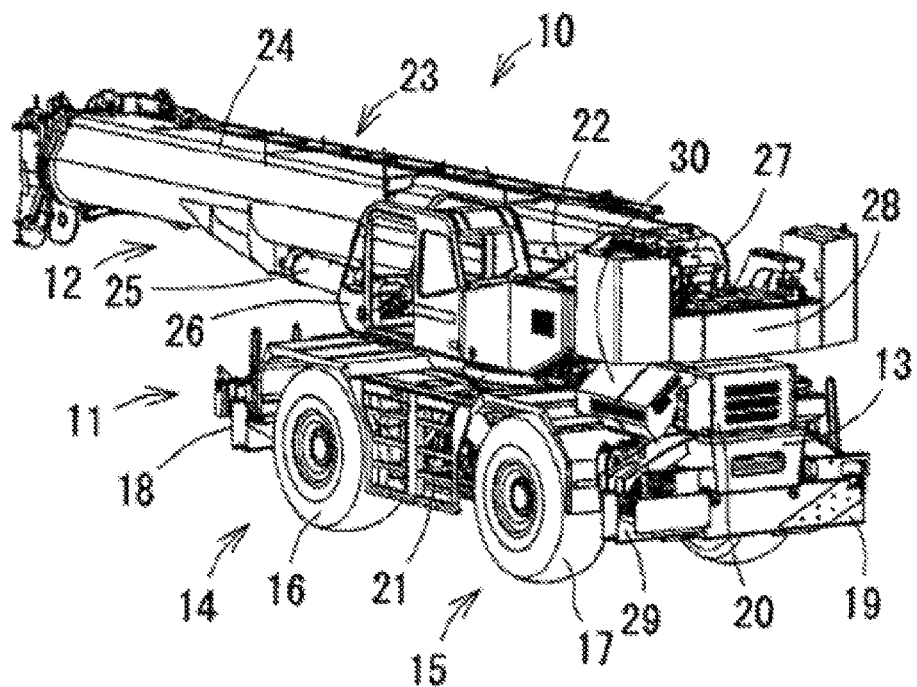
FIGS. 1(a) and 1(b) are perspective views of a rough terrain crane according to one embodiment of the invention.
Figure 1:
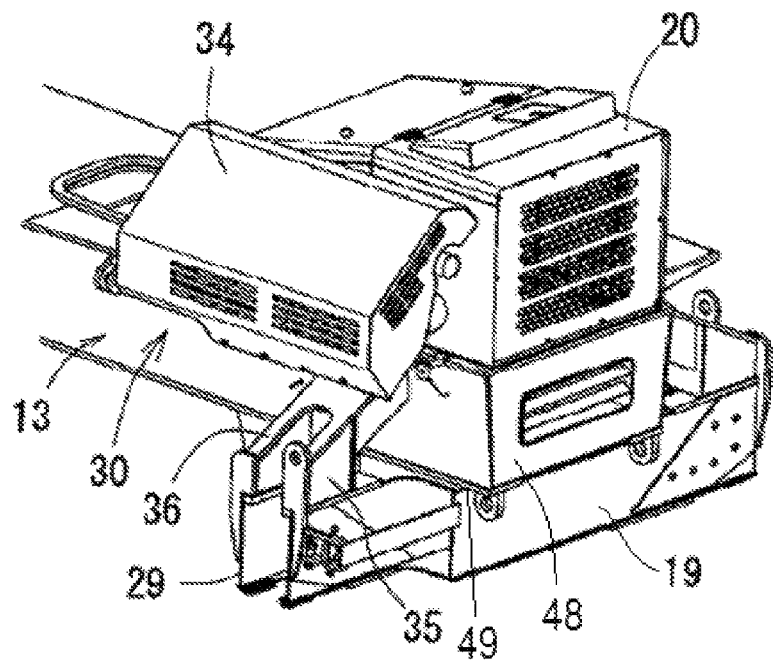

FIGS. 1(a) and 1(b) are perspective views of a rough terrain crane 10 according to one embodiment of the invention, in which FIG. 1(a) is a perspective view of the appearance and FIG. 1(b) is an enlarged perspective view of the essential portion.

The rough terrain crane 10 has a carrier 11 and a working unit 12.

The carrier 11 has a lower frame 13 and the lower frame 13 is provided with a front axle 14 and a rear axle 15. A diesel engine serving as the drive source of the front axle 14 and the rear axle 15 is mounted on a rear end portion 48 of the lower frame 13. Wheels 16 and 17 of the front axle 14 and the rear axle 15, respectively, are driven through a transmission that is not illustrated and are steered by a hydraulic cylinder that is not illustrated. A front outrigger 18 and a rear outrigger 19 are provided at a front end portion and a lower side 49 of the rear end portion, respectively, of the lower frame 13, so that the carrier 11 is stably grounded when operating the working unit 12. For simplification of the drawings, the front outrigger 18 and the rear outrigger 19 are partially omitted and, in the drawings, only a case 29 is illustrated. In the lower frame 13, a hydraulic pump (not-illustrated) supplies hydraulic pressure to a hydraulic motor and the working unit 12 A diesel engine 20 has an engine body (not illustrated) and an engine cover (not illustrated) that covers the engine body. In this embodiment, the diesel engine includes also the engine cover.

The working unit 12 has the lower frame 13. On the lower frame 13, a slewing base 22 is turnably mounted through a slewing bearing 21. A boom device 23 is coupled to the slewing base 22 through a raising/falling center pin. The boom device 23 is supported in such a manner as to be raised and lowered with the raising/falling center pin. An expansion boom 24 contains an expansion cylinder that is not illustrated. Operating the expansion cylinder causes the expansion boom 24 to expand and contract. The boom device 23 has a winch 27 that is driven by the hydraulic motor. Operating the winch 27 moves a work up and down. To stabilize the working unit 12, a counter weight 28 is provided at a rear portion of the slewing base 22. A single operating unit 26 for driving the carrier 11 and operating the working unit 12 is provided through the slewing bearing 21.

One feature of this embodiment the rough terrain crane 10 is an exhaust emission control device 30 (described later in detail) mounted adjacent to the diesel engine 20. The exhaust emission control device 30 receives the exhaust gas emitted from the diesel engine 20 and controls the same. Specifically, the exhaust emission control device 30 has a diesel oxidation catalyst (hereinafter referred to as "DOC") 31, a selective catalytic reduction (hereinafter referred to as "SCR") 32 that reduces nitrogen oxide in the exhaust emission through a predetermined reducing agent, and a decompression reactor tube (hereinafter referred to as "DRT") 33 that supplies the reducing agent to the SCR 32 (refer to FIG. 2). One feature of this embodiment of the rough terrain crane 10 is that these devices are laid out as described later. The exhaust emission control device 30 can provide excellent exhaust emission control performance while demonstrating the merits of the rough terrain crane to the greatest extent if exhaust gas control becomes more and more strict in the future.

Exhaust Emission Control Device

The exhaust emission control device 30 is disposed on the left side as viewed from the rear of the vehicle as illustrated in FIG. 1(b). As described above, the exhaust emission control device 30 has the DOC 31, DRT 33, and the SCR 32. A cover 34 is provided over these devices. The cover 34 protects the exhaust emission control device 30 from being exposed to rain and dust.

The case 29 of the rear outrigger 19 is provided with a support member 35. The support member 35 contains a rib which strengthens the case 29 and is fixed to the case 29 and the lower frame 13. The support member 35 is disposed in such a manner as to bridge the case 29 and the side surface of the lower frame 13. Therefore, an upper surface 36 of the support member 35 inclines outwardly from the side surface of the lower frame 13 in an oblique downward direction.

Figure 2:
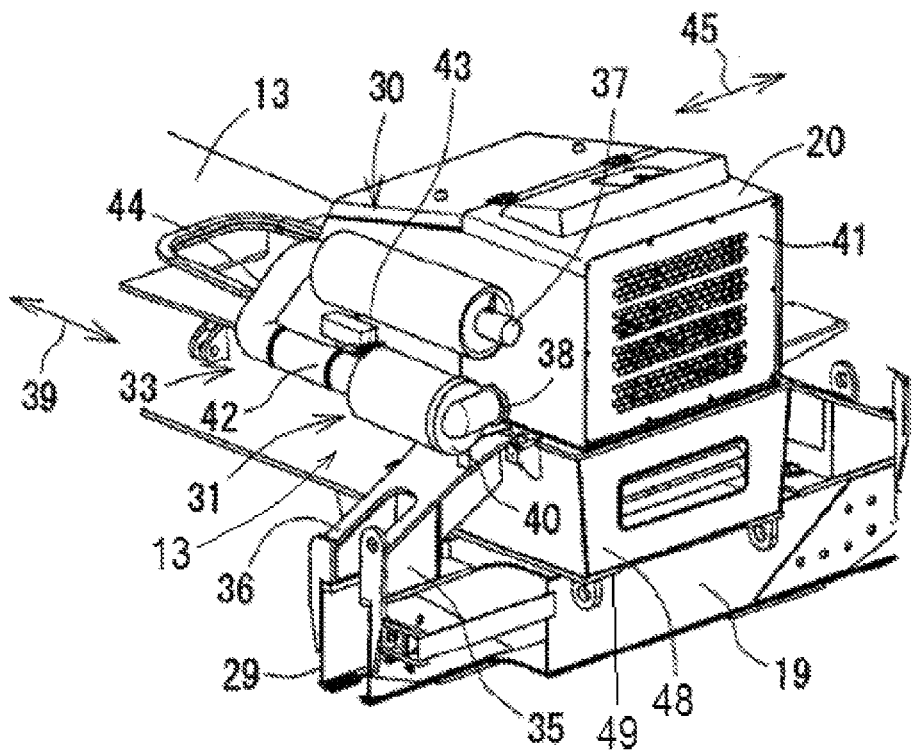
FIGS. 2(a) and 2(b) are perspective views of an exhaust emission control device according to one embodiment of the invention.
Figure 2:
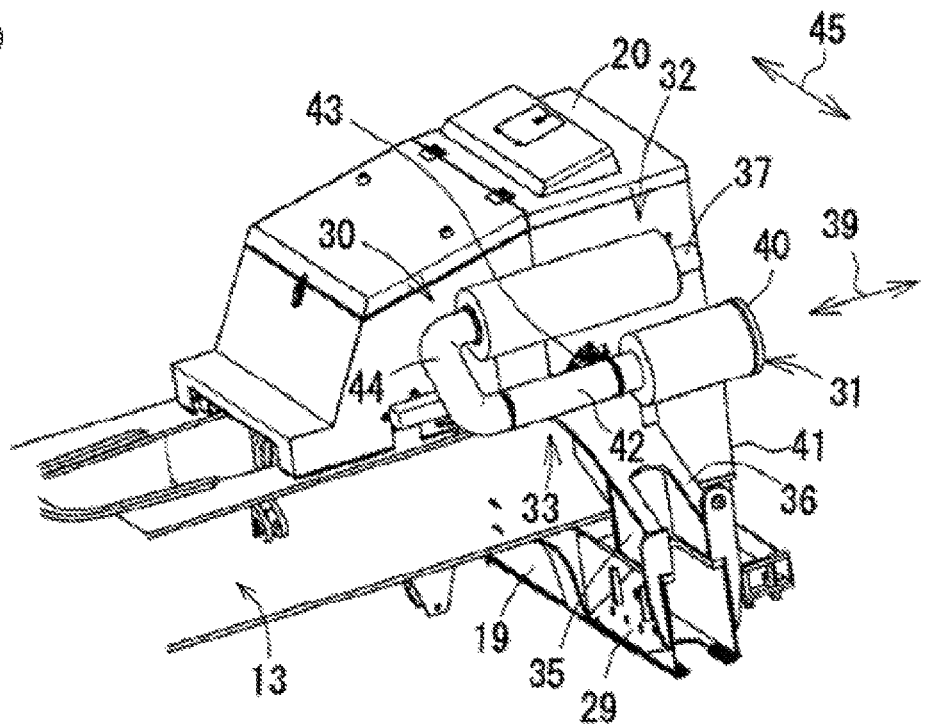
Figure 3:
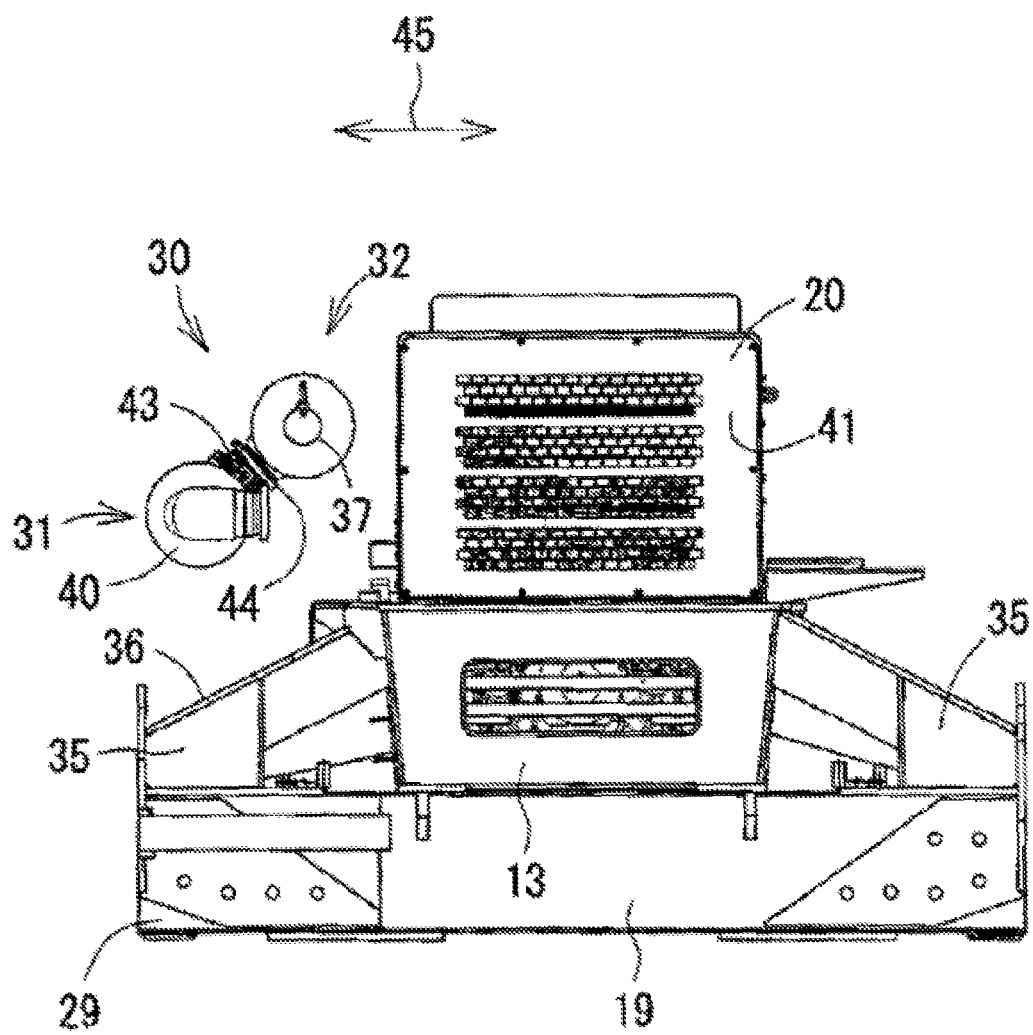
FIG. 3 is a rear view of the enlarged essential portion of a base carrier according to one embodiment of the invention.

FIGS. 2(a) and 2(b) are perspective views of the exhaust emission control device 30. FIG. 3 is a rear view of the enlarged essential portion of the carrier 11. FIGS. 2 and 3 illustrate the layout of the exhaust emission control device 30 in detail, in which a bracket for fixing the exhaust emission control device 30 and the like are omitted.

The exhaust emission from the diesel engine 20 is first supplied to the DOC 31, and successively passes through the DRT 33 and the SCR 32 to be emitted as exhaust gas to the atmosphere from a tail pipe 37.

The DOC is connected to an exhaust pipe 38 of the diesel engine 20. The structure of the DOC 31 is already known. The DOC 31 mainly aims at treating unburned fuel (HC and the like) and carbon monoxide (CO) contained in the exhaust emission and oxidizing nitrogen monoxide (NO) and nitrogen dioxide (NO2) contained in the exhaust emission. The DOC 31 oxidizes CO to carbon dioxide (CO2) burns HC as an increase in the exhaust gas temperature. In this embodiment, the DOC 31 has a casing and the outer shape of the casing is a cylindrical shape. The center axis line of the DOC 31 is along the front-back direction of the vehicle, i.e., a longitudinal direction 39 of the lower frame 13. A rear end 40 of the DOC 31 is disposed on the front side relative to a rear end 41 of the diesel engine 20. In other words, the DOC 31 does not protrude in a backward direction from the rear end 41 of the diesel engine 20. Exhaust emitted from the exhaust pipe 38 flows to the front in the longitudinal direction in the DOC 31.

The SCR 32 reacts with a reducing agent (urea water in this embodiment) in the exhaust to reduce nitrogen oxide (NOX), and then finally converts the exhaust to a gas mixture of nitrogen (N2) and water (H2O) and emits the same to the atmosphere. The DRT 33 supplies urea water (reducing agent) for reducing the NOX in the exhaust emission. When the DRT 33 ejects the urea water into the exhaust emission, hydrolysis occurs to generate ammonium (NH3), and then the NOX is reduced by the NH3. Both the structure of the SCR 32 and the structure of the DRT 33 are already known.

In this embodiment, the DRT 33 has a cylindrical pipe 42 and a supply nozzle 43 connected thereto. The supply nozzle 43 is connected to a urea water tank which is not illustrated, and the urea water is ejected into the cylindrical pipe 42 at a predetermined pressure. The DRT 33 is disposed in series with the DOC 31. More specifically, the center axis line of the DRT 33 is in agreement with the center axis line of the DOC 31. The DRT 33 is disposed on the front side in the longitudinal direction 39 of the DOC 31 and extends in the forward direction. The exhaust emission passing through the DOC 31 flows along the longitudinal direction 39 to flow into the cylindrical pipe 42 of the DRT 33, and then receives the supply of the urea water from the supply nozzle 43.

The SCR 32 has a casing and the outer shape is formed into a cylindrical shape. The center axis line of the SCR 32 is along the longitudinal direction 39. In this embodiment, the SCR 32 is disposed in parallel to the DOC 31. The SCR 32 and the DOC 31 are coupled with a U-shaped coupling pipe 44. The exhaust emission passing through the DRT 32 enters the coupling pipe 44, and then makes a U-turn to enter the SCR 32. In the SCR 32, the exhaust emission is controlled to be discharged as N2 and H2O as described above.

As illustrated in FIG. 3, the SCR 32 is disposed on the upper side relative to the DOC 31 and is disposed in parallel to the DOC 31 along a lateral direction of the lower frame 13. More specifically, the center axis line of the SCR 32 and the center axis line of the DOC 31 are in parallel to each other and the SCR 32 and the DOC 31 face each other in the lateral direction 45. Moreover, the SCR 32 and the DOC 31 are disposed above the support member 35. In particular, in this embodiment, the SCR 32 is disposed in such a manner as to be shifted to the diesel engine 20 side relative to the DOC 31 and both the SCR 32 and the DOC 31 are disposed along an upper surface 36 of the support member 35.

Operational Advantages by Exhaust Emission Control Device

In this embodiment, as illustrated in FIGS. 2(a) and 2(b), the DOC 31 and the DRT 33 are disposed in series and the DOC 31 and the SCR 32 are disposed in parallel. More specifically, the exhaust emission control device 30 is laid out in a compact manner in the lower frame 13. Therefore, the exhaust emission control device 30 does not protrude backward relative to the rear end 41 of the diesel engine 30, avoiding an increase in the length of the vehicle in the longitudinal direction 39 (vehicle overall length direction). Moreover, the DOC 31, the SCR 32, and the DRT 33 are not all disposed in parallel: only the DOC 31 and the SCR 32 are disposed in parallel, and therefore the exhaust emission control device 30 does not protrude outward relative to the outer edge of the rear outrigger 19, avoiding an increase in the width of the vehicle in the lateral direction (vehicle width direction).

Furthermore, the DOC 31 and the SCR 32 are vertically disposed and are disposed at a position adjacent to the diesel engine 20 above the rear outrigger 19, and therefore the exhaust emission control device 30 is disposed in a very compact manner utilizing the space of the left end or the right end of the rear end portion of the vehicle. Accordingly, even when the boom device 23 is slued during the crane operation, a region where the exhaust emission control device 30 blocks the view of an operator (the so-called driver's blind spot) does not expand. In addition, exhaust emission piping of the exhaust emission control device 30 is simplified and the piping route is shortened, helping to maintain exhaust temperature and improving the performance of the exhaust emission control device 30.

In this embodiment, the DOC 31 and the DRT 33 are disposed in series but the DRT 33 and the SCR 32 may be disposed in parallel. It is a matter of course that the DOC 31 and the SCR 32 are disposed in parallel even in this case.

In this embodiment, as illustrated in FIG. 3, the SCR 32 is disposed on the side of the diesel engine 20 relative to the DOC 31. More specifically, the SCR 32 is further shifted to the side of the center of the vehicle and disposed at a position close to the diesel engine 20. Such a layout utilizes the space in the upper portion of the rear outrigger 19 more effectively and further simplifies the route (piping) of the exhaust emission control device.

In this embodiment, the support member 35 contains a strengthening rib coupling the lower frame 13 and the case 29 of the rear outrigger 19. The upper surface 36 of the support member 35 inclines from the lower frame 13 to the case 29 and the DOC 31 and the SCR 32 are disposed along the upper surface 36. More specifically, the DOC 31 and the SCR 32 are more efficiently disposed in the space of a side portion of the diesel engine 20, so that a compact layout is achieved.

Modifications of Embodiments

Next, modifications of this embodiment are described.

FIGS. 4(a) and 4(b) illustrate a modified layout of the exhaust emission control device 30, in which FIG. 4(a) is a plan view and FIG. 4(b) is a rear view. FIG. 5 is a rear view illustrating the layout of the exhaust emission control device 30 according to this modification.

Figure 4:
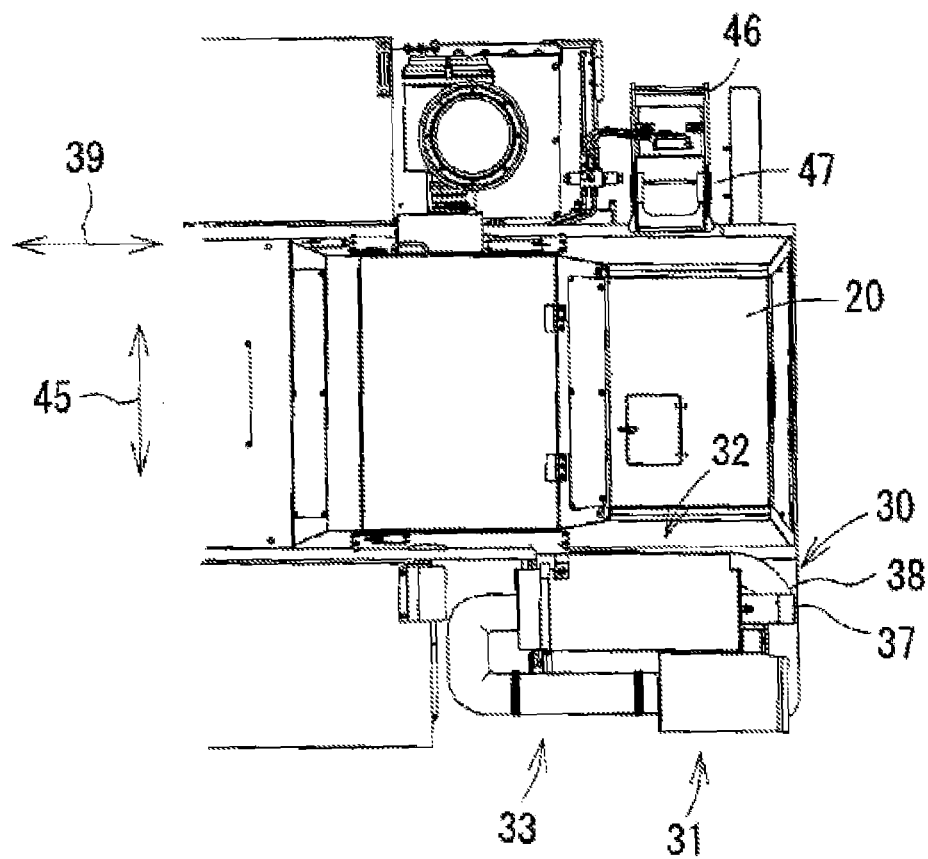
FIGS. 4(a) and 4(b) are views illustrating the layout of an exhaust emission control device according to a modification of the embodiment.
Figure 4:
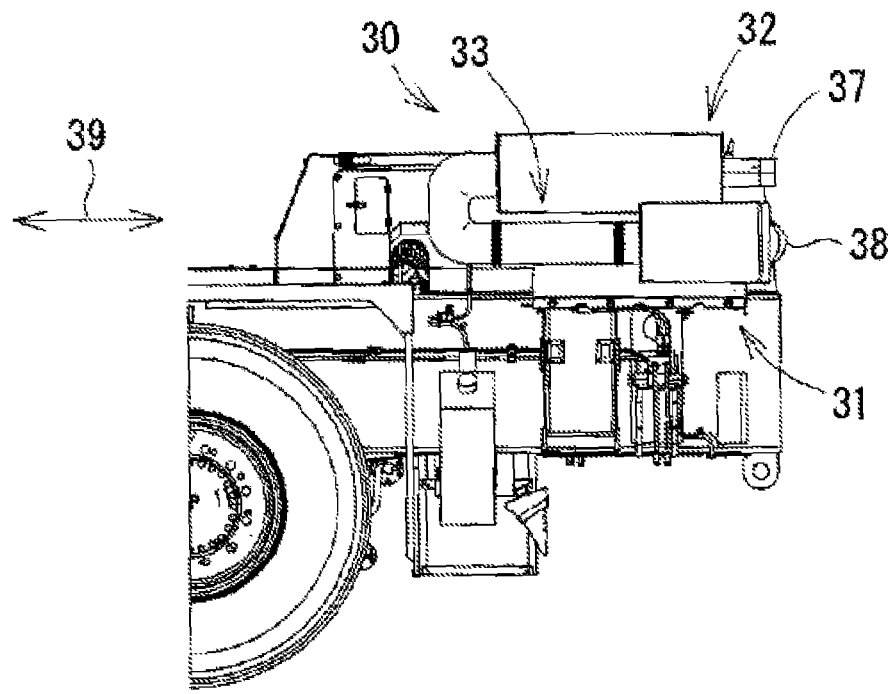
Figure 5:
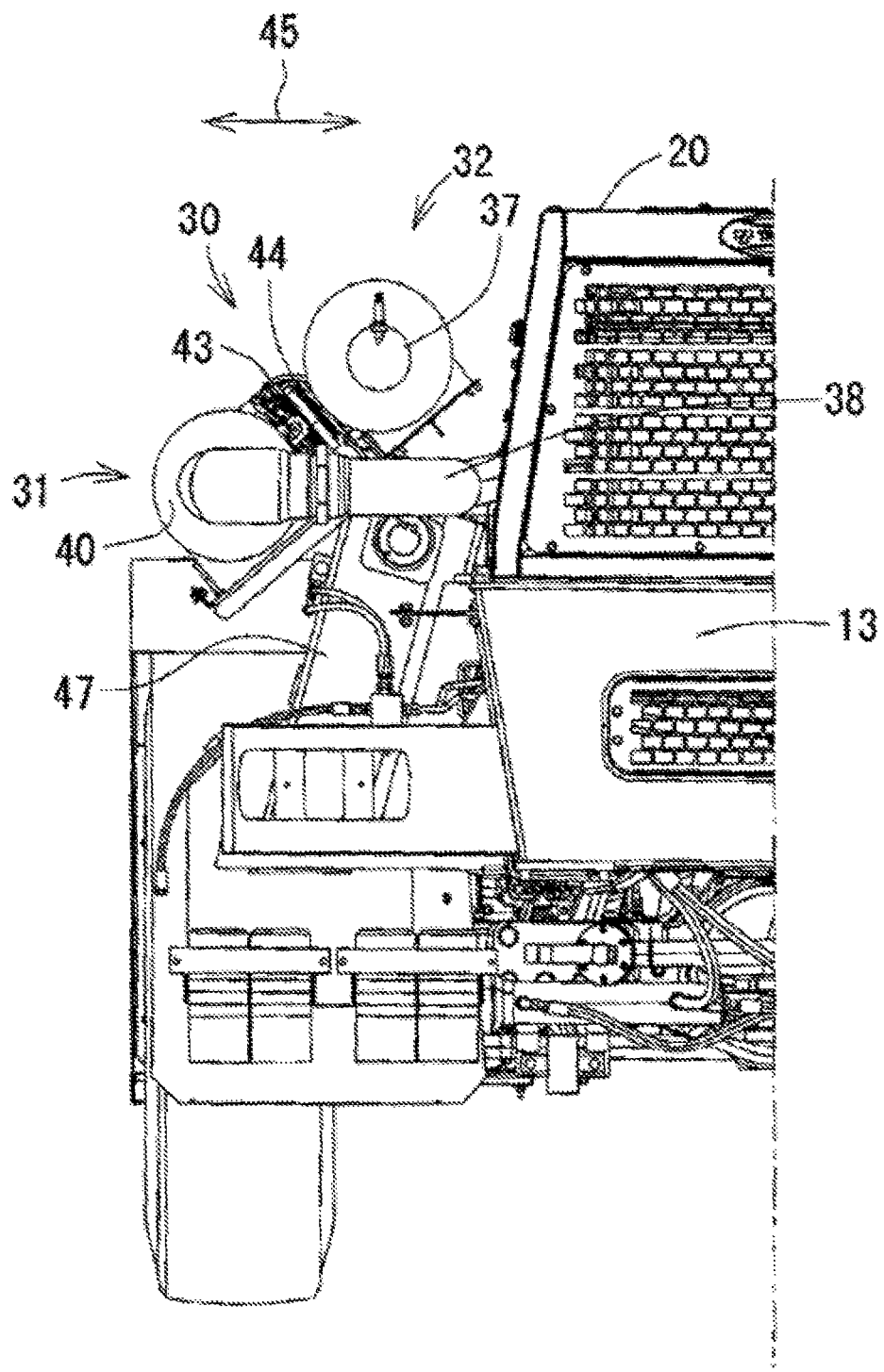
FIG. 5 is a view illustrating the layout of an exhaust emission control device according to a modification of the embodiment.

The layout of the exhaust emission control device 30 of this modification is different from the layout of the exhaust emission control device 30 according to the above-described embodiment in that the rough terrain crane 10 in the earlier described embodiment has the so-called H-shaped rear outrigger 19 (refer to FIG. 2) while, on the other hand, a so-called X-shaped outrigger (not-illustrated) and the exhaust emission control device 30 is disposed above a jack cylinder suspending the rear outrigger (refer to FIGS. 4 and 5). The other configurations are the same as those of the earlier-described embodiment.

In this modification, the jack cylinder 47 is a hydraulic cylinder that also functions as the support member that is used in the above-described embodiment. By elongating the jack cylinder 47, the rear outrigger is pressed against the ground surface.

In the case of the X-shaped rear outrigger, a so-called dead space is formed around the jack cylinder 47 due to the design. However, in the layout of the exhaust emission control device 30 of this modification, the DOC 31 and the SCR 32 are disposed in parallel in the dead space. Accordingly, the same operational advantages as those of the lay out of the exhaust emission control device 30 according to the above-described embodiment are demonstrated. In the above-described embodiment and the modification, the exhaust emission control device 30 has the DOC 31, the SCR 32, and the DRT 33 but a diesel particulate filter (hereinafter referred to a "DPF") may be provided in the place of the DOC 31. More specifically, the exhaust emission from the diesel engine 20 is first supplied to the DPF, and successively passes through the DRT 33 and the SCR 32 to be emitted to the atmosphere from a muffler 37.

The DPF is connected to the exhaust pipe 38 of the diesel engine 20. The structure of the DPF is already known and is a device that collects particulate matter (hereinafter referred to as "PM") contained in the exhaust emission, and then continuously oxidizes the same to remove the same. In general, the DPF also has a casing, and the outer shape of the casing is formed into a cylindrical shape. The center axis line of the DPF is disposed along the front-back direction of the vehicle, i.e., the longitudinal direction 39 of the lower frame 13 (refer to FIGS. 2 and 3). The DPF is disposed in such a manner that the rear end thereof does not protrude in the backward direction from the rear end 41 of the diesel engine 20. The exhaust emission emitted from the exhaust pipe 38 flows in the forward direction in the longitudinal direction 39 in the DPF 31, enters the DRT 33, and then is subjected to the same exhaust treatment as that of the above-described embodiment.

REFERENCE SIGNS LIST

10 Rough terrain crane
11 Carrier
12 Working unit
13 Lower frame
14 Front axle
15 Rear axle
19 Rear outrigger
20 Diesel engine
30 Exhaust emission control device
31 DOC
32 SCR
33 DRT
35 Support member
36 Upper surface
39 Longitudinal direction
40 Rear end
41 Rear end
42 Cylindrical pipe
43 Supply valve
44 Coupling pipe
45 Lateral direction
47 Jack cylinder

What is claimed is:

1. A rough terrain crane with an exhaust emission control device, comprising:
    a carrier having a front axle and a rear axle; and
    a boom device disposed on an upper side of the carrier; wherein
    the carrier has a lower frame, a rear outrigger disposed on a lower side of a rear end portion of the lower frame, and an engine that is disposed on the rear end portion of the lower frame, powers traveling, and supplies hydraulic pressure,
    the exhaust emission control device comprises
        a diesel oxidation catalyst that is coupled to an exhaust pipe extending from the engine, and treats unburned fuel and carbon monoxide in the exhaust emission,
        a decomposition reactor tube that is disposed downstream of the diesel oxidation catalyst and supplies a reducer to nitrogen oxides in the exhaust emission, and
        a selective catalytic reduction device that is disposed downstream of the decomposition reactor tube and reduces nitrogen oxides in the exhaust emission into nitrogen ($N_2$) and water ($H_2O$),
    the decomposition reactor tube is joined to at least one of the diesel oxidation catalyst and the selective catalytic reduction device in series along a longitudinal direction of the lower frame,
    the diesel oxidation catalyst and the selective catalytic reduction device are disposed in parallel and with at least one longitudinal element of the selective catalytic reduction device facing a longitudinal element of the diesel oxidation catalyst,
    the diesel oxidation catalyst is disposed along the longitudinal direction above a bracket that supports a case of the rear outrigger,
    the selective catalytic reduction device is disposed along the longitudinal direction on an upper side relative to the diesel oxidation catalyst, and
    the selective catalytic reduction device is disposed at a position on a side of the engine relative to the diesel oxidation catalyst.

2. The rough terrain crane with an exhaust emission control device according to claim 1, wherein the bracket is a strengthening rib that couples the lower frame and the case of the rear outrigger.

3. The rough terrain crane with an exhaust emission control device according to claim 1, wherein the bracket is a hydraulic cylinder that is disposed between the lower frame and the case of the rear outrigger, and presses the case against the ground surface.

4. A rough terrain crane with an exhaust emission control device, comprising:
    a carrier having a front axle and a rear axle; and
    a boom device disposed on an upper side of the carrier; wherein
    the carrier has a lower frame, a rear outrigger disposed on a lower side of a rear end portion of the lower frame, and an engine that is disposed on the rear end portion of the lower frame, powers traveling, and supplies hydraulic pressure,
    the exhaust emission control device comprises a diesel particulate filter that is coupled to an exhaust pipe extending from the engine and to which exhaust emission is supplied, a decomposition reactor tube disposed downstream of the diesel particulate filter and supplies a reducer to nitrogen oxides in the exhaust emission, and a selective catalytic reduction device that is disposed downstream of the decomposition reactor tube and reduces nitrogen oxides in the exhaust emission into nitrogen ($N_2$) and water ($H_2O$),
    the decomposition reactor tube is joined to the diesel particulate filter or the selective catalytic reduction device in series along a longitudinal direction of the lower frame and the diesel particulate filter and the selective catalytic reduction device are disposed in parallel and with at least one longitudinal element of the selective catalytic reduction device facing a longitudinal element of the diesel particulate filter,
    the diesel particulate filter is disposed along the longitudinal direction above a bracket that supports a case of the rear outrigger, and the selective catalytic reduction device is disposed along the longitudinal direction on an upper side relative to the diesel particulate filter, and
    the selective catalytic reduction device is disposed at a position on a side of the engine relative to the diesel particulate filter.

5. The rough terrain crane with an exhaust emission control device according to claim 4, wherein the bracket is a strengthening rib that couples the lower frame and the case of the rear outrigger.

6. The rough terrain crane with an exhaust emission control device according to claim 4, wherein the bracket is a hydraulic cylinder that is disposed between the lower frame and the case of the rear outrigger, and presses the case against the ground surface.

\* \* \* \* \*